United States Patent
Uchikawa (10) Patent No.: US 9,137,419 B2
(45) Date of Patent: Sep. 15, 2015

(54) COMMUNICATION APPARATUS CAPABLE OF EXECUTING A DIRECT WIRELESS COMMUNICATION, COMMUNICATION APPARATUS CONTROL METHOD, AND PROGRAM

(71) Applicant: CANON KABUSHIKI KAISHA, Tokyo (JP)

(72) Inventor: Shinichi Uchikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/259,770

(22) Filed: Apr. 23, 2014

(65) Prior Publication Data

US 2014/0320886 A1  Oct. 30, 2014

(30) Foreign Application Priority Data

Apr. 26, 2013 (JP) .................................. 2013-093889

(51) Int. Cl.
| | |
|---|---|
| *G06F 15/00* | (2006.01) |
| *G06K 1/00* | (2006.01) |
| *G06K 15/00* | (2006.01) |
| *H04N 1/44* | (2006.01) |
| *G06F 3/12* | (2006.01) |
| *H04N 1/00* | (2006.01) |
| *H04W 12/08* | (2009.01) |

(52) U.S. Cl.
CPC ............ *H04N 1/4433* (2013.01); *G06F 3/1222* (2013.01); *G06F 3/1236* (2013.01); *G06F 3/1238* (2013.01); *G06F 3/1292* (2013.01); *H04N 1/00278* (2013.01); *H04N 1/00281* (2013.01); *H04W 12/08* (2013.01); *H04N 2201/0094* (2013.01); *H04N 2201/0096* (2013.01)

(58) Field of Classification Search
CPC ............ H04N 1/4433; H04N 1/00278; H04N 1/00281; G06F 3/1222; G06F 3/1236; G06F 3/1292; G06F 3/1238
USPC ................................ 358/1.1, 1.14, 1.15, 1.13
See application file for complete search history.

(56) References Cited

U.S. PATENT DOCUMENTS

| | | | |
|---|---|---|---|
| 2012/0208462 A1* | 8/2012 | Lee et al. ...................... | 455/41.2 |
| 2013/0201525 A1* | 8/2013 | Niwa ........................... | 358/1.15 |

FOREIGN PATENT DOCUMENTS

JP    2012-199884 A    10/2012

* cited by examiner

*Primary Examiner* — Douglas Tran
(74) *Attorney, Agent, or Firm* — Canon USA, Inc., IP Division (57) ABSTRACT

When a communication partner of wireless communication is identified, a user is prompted to ascertain whether to execute wireless communication with the identified communication partner. When the user has given an instruction to execute wireless communication, connection processing of wireless communication with a communication apparatus identified as the communication partner is executed. Furthermore, if the identified communication partner is a permitted device, connection processing of wireless communication can be executed without requiring the user to confirm.

13 Claims, 7 Drawing Sheets

300 SETTING SCREEN

FIG. 3B

310 SETTING SCREEN

FIG. 3C

320 SETTING SCREEN

700 CONNECTION CONFIRMATION SCREEN

FIG. 7B

710 REGISTRATION CONFIRMATION SCREEN

COMMUNICATION APPARATUS CAPABLE OF EXECUTING A DIRECT WIRELESS COMMUNICATION, COMMUNICATION APPARATUS CONTROL METHOD, AND PROGRAM

BACKGROUND OF THE INVENTION

1. Field of the Invention

The present invention relates to a communication apparatus, a communication apparatus control method, and a program.

2. Description of the Related Art

Standards called Wi-Fi Direct (registered trademark) have been established by the Wi-Fi Alliance. In the Wi-Fi Direct, a protocol for determining whether a communication apparatus such as a personal computer (PC) or a printing device operates as an access point or a client is prescribed. A communication apparatus that becomes the access point and a communication apparatus that becomes client can be automatically determined by executing the protocol. It becomes unnecessary to prepare an access point separately and the communication apparatuses can execute wireless communication directly with each other by utilizing the Wi-Fi Direct. Japanese Patent Application Laid-Open No. 2012-199884 describes transmission and reception of voice data and photograph data utilizing the Wi-Fi Direct.

It is possible for communication apparatuses to identify a communication partner and perform direct communication with each other simply by using the above-described Wi-Fi Direct. For example, it is possible to connect a printing device and a portable terminal to each other by using the Wi-Fi Direct, transmit printing data from the portable terminal to the printing device, and transmit image data read by the printing device with a scanner to the portable terminal.

However, for example, while the printing device is searching for a communication partner to transmit image data read by using the scanner to a first portable terminal, a second portable terminal different from the first portable terminal may be also searching for a communication partner. At this time, the printing device may identify not the first portable terminal but the second portable terminal as a communication partner in some cases. Therefore, the printing device is connected to the second portable terminal that is not intended by the user of the first portable terminal. If the user of the first portable terminal transmits image data from the printing device to a portable terminal without being aware of this fact, the image data is transmitted not to the first portable terminal but to the second portable terminal.

As a countermeasure, it is conceivable that when a communication partner of wireless communication is identified, the user is required to ascertain whether to execute communication with the identified communication partner. However, for the user, it is necessary to ascertain whenever wireless communication is established. This imposes labor on the user.

SUMMARY OF THE INVENTION

According to an aspect of the present invention, a mechanism for use in wireless communication does not need to have confirmation from a user to establish communication with a communication partner of the wireless communication when the communication partner is identified and the identified communication partner is a device that satisfies a specific condition.

According to another aspect of the present invention, a communication apparatus for use in executing a wireless communication includes an identification unit configured to identify a communication partner of the wireless communication, a determination unit configured to determine whether an external device identified by the identification unit is a permitted device that is permitted as a communication partner of the wireless communication, a display unit configured to display a confirmation screen to prompt a user to ascertain whether to execute the wireless communication with the external device when the determination unit has determined that the external device is not the permitted device, and a connection unit configured to execute connection processing to execute the wireless communication with the external device when the determination unit has determined that the external device is the permitted device or when the user has given an instruction to execute the wireless communication with the external device via the confirmation screen.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. Note that exemplary embodiments described below do not limit the invention according to claims. Furthermore, all combinations of features described in the exemplary embodiments are not always necessary as a means of solution of the invention.

Figure 1:
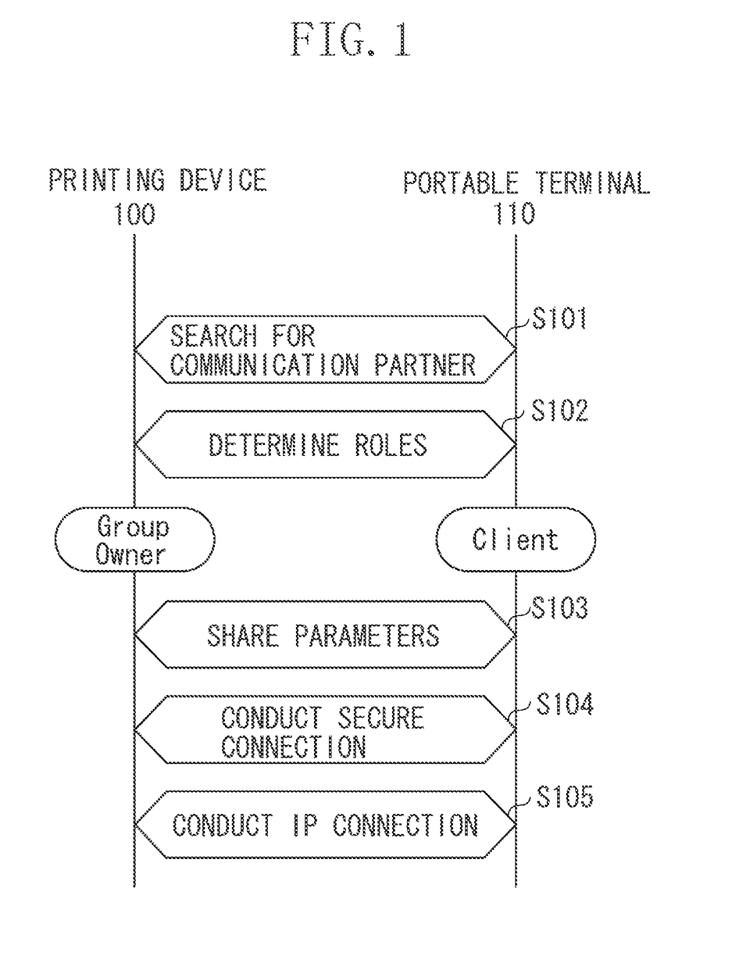
FIG. 1 is a diagram illustrating a processing sequence of the Wi-Fi Direct.

A first exemplary embodiment will now be described. FIG. 1 is a diagram illustrating a processing sequence of Wi-Fi Direct. A printing device 100 and a portable terminal 110 are examples of communication apparatuses supporting the Wi-Fi Direct.

First, in step S101, each of the printing device 100 and the portable terminal 110 conducts device search to identify a communication partner. Upon identifying a communication partner by the device search, in step S102, the printing device 100 and the portable terminal 110 determine which becomes an access point (GroupOwner) and which becomes a client. The processing in step S102 is referred to as role determination. In FIG. 1, the printing device 100 becomes the GroupOwner and the portable terminal 110 becomes the client as a result of the role determination in step S102.

Then, the printing device 100 serving as the GroupOwner provides the portable terminal 110 serving as the client with parameters for performing connection by using Wi-Fi Protected Setup (WPS) established by the Wi-Fi Alliance. In step S103, therefore, the printing device 100 and the portable terminal 110 share the parameters. In step S104, secure connection is conducted by using the parameters. Note that the secure connection is executed as communication in a data link layer of an open systems interconnection (OSI) reference model until the processing in step S104 is completed.

If the secure connection is completed, in step S105, addressing for conducting internet protocol (IP) communication between the printing device 100 and the portable terminal 110 is conducted. At this time, the printing device 100 which is the GroupOwner operates as a dynamic host configuration protocol (DHCP) server, and gives an internet protocol (IP) address to the portable terminal 110 which is the client. Note that in processing in step S105 and subsequent processing, communication in a layer upper than the network layer of the OSI reference model can be executed.

Wireless communication is established between the printing device 100 and the portable terminal 110 by conducting processing described heretofore. The printing device 100 and the portable terminal 110 can execute communication directly without separately preparing an access point, by using the wireless communication.

Figure 2:
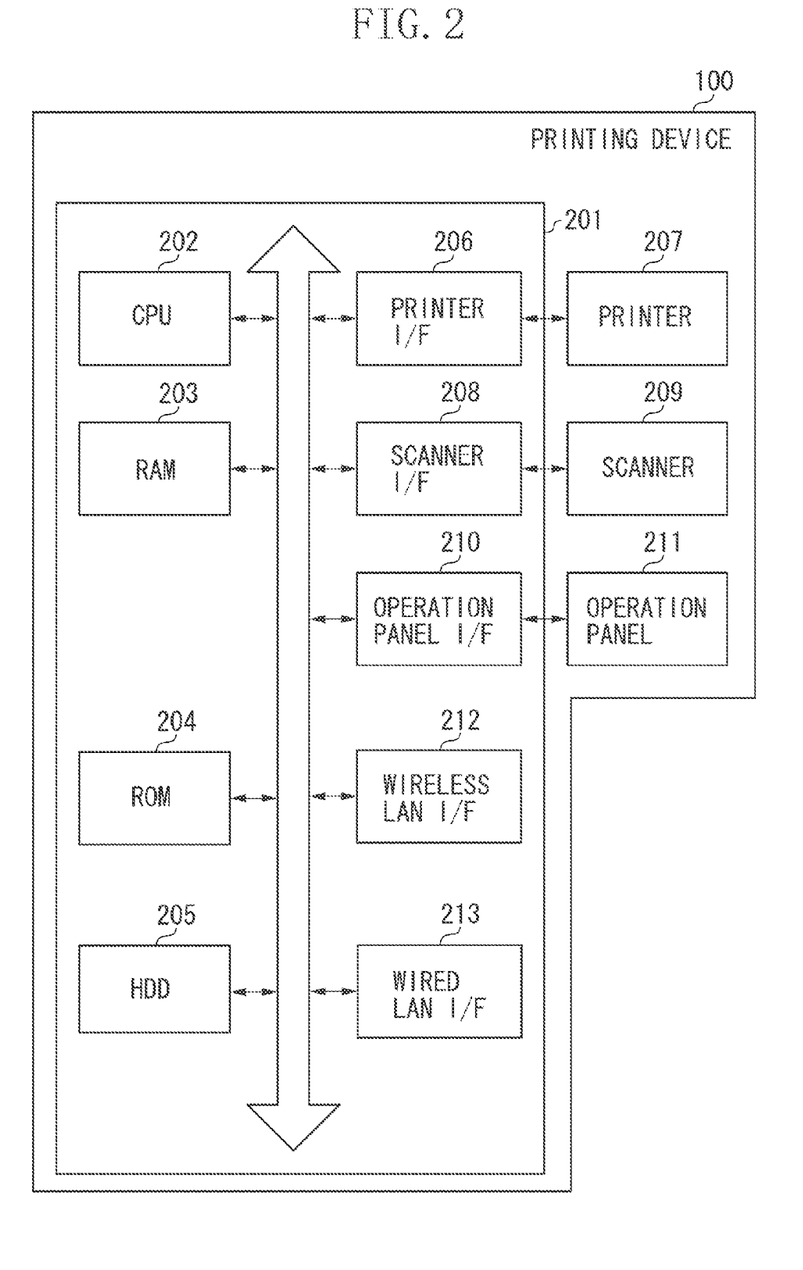
FIG. 2 is a diagram illustrating a hardware configuration of a printing device.

FIG. 2 is a diagram illustrating a hardware configuration of the printing device 100. The printing device 100 is an example of a communication apparatus capable of executing wireless communication.

A control unit 201 including a central processing unit (CPU) 202 controls operation of the entire printing device 100. The CPU 202 reads a control program stored in a read only memory (ROM) 204 and performs various kinds of control such as communication control. A random access memory (RAM) 203 is used as temporary regions for a main memory and a work area of the CPU 202. A hard disk drive (HDD) 205 stores data, various programs or various information tables. Furthermore, the HDD 205 can store image data transmitted from an external device.

A printer interface (I/F) 206 connects a printer 207 (printer engine) and the control unit 201 to each other. The printer 207 executes printing processing on a sheet supplied from a sheet cassette which is not illustrated, based on print data that is input via the printer I/F 206.

A scanner I/F 208 connects a scanner 209 and the control unit 201 to each other. The scanner 209 reads a placed document, and generates image data. The image data generated by the scanner 209 is printed by the printer 207, stored in the HDD 205, or transmitted to an external device via a wireless local area network (LAN) I/F 212 or a wired LAN I/F 213.

An operation panel I/F 210 connects an operation panel 211 and the control unit 201 to each other. The operation panel 211 includes a liquid crystal display unit having a touch panel function, a keyboard, and various function keys. A user can check a screen displayed on the operation panel 211, and input various instructions to the printing device 100 by using a touch panel.

The wireless LAN I/F 212 executes wireless communication with an external device such as a portable terminal or a PC. The printing device 100 receives print data from an external device by using the wireless communication. The printer 207 executes print processing based on the received print data. Furthermore, the printing device 100 can also transmit the image data generated by the scanner 209 to an external device via the wireless LAN I/F 212.

The wired LAN I/F 213 is connected to a LAN cable which is not illustrated. The wired LAN I/F 213 can execute communication with an external device which is not illustrated.

Note that, in the printing device 100, one CPU 202 is provided to execute each processing illustrated in flow charts described below by using one memory (RAM 203). However, a different form may be used. For example, one or more CPUs and one or more memories can be configured to cooperate to execute each processing illustrated in flow charts described below.

Figure 3A:
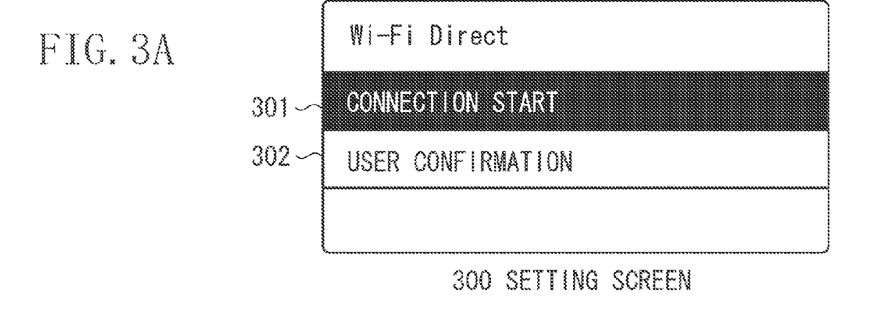
FIGS. 3A, 3B, and 3C are diagrams illustrating screens displayed on an operation panel.

In the present exemplary embodiment, the printing device 100 can execute the Wi-Fi Direct. A setting screen 300 in FIG. 3A is a screen displayed on the operation panel 211. The setting screen 300 is used when the user gives an instruction to execute the Wi-Fi Direct. If the user selects an item 301 by a touch operation or the like, the printing device 100 executes processing illustrated in FIG. 4 and described below to connect to an external device by using the Wi-Fi Direct.

Furthermore, in the present exemplary embodiment, when a communication partner is searched for and a communication partner is identified, the user is prompted to ascertain whether the identified communication partner is a communication partner intended by the user (hereafter, the function of prompting the user to ascertain the intended communication partner is referred to as user confirmation function). Therefore, when a device that is not intended by the user is identified, the user can become aware of the mistake.

Figure 3B:
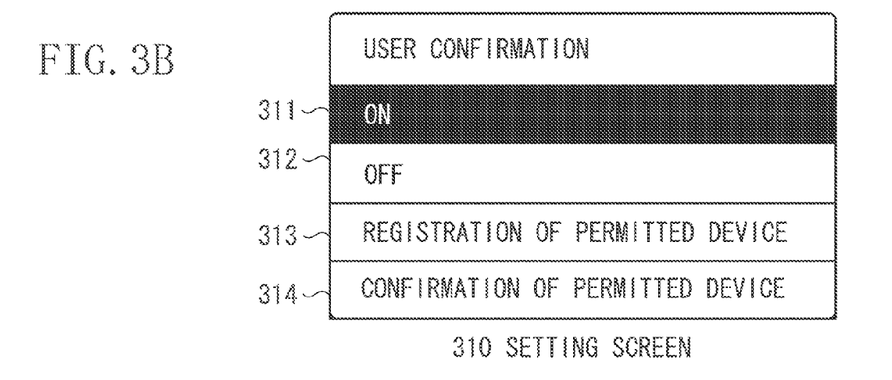

Furthermore, in the present exemplary embodiment, the user can previously set on the printing device 100 whether to make the user confirmation function effective. If the user selects an item 302 on the setting screen 300 in FIG. 3A, a setting screen 310 illustrated in FIG. 3B is displayed on the operation panel 211. If the user selects an item 311 on the setting screen 310, it is stored in a memory such as the HDD 205 to make the user confirmation function valid. On the other hand, if the user selects an item 312, it is stored in the memory such as the HDD 205 to make the user confirmation function invalid. The setting conducted on the setting screen 310 is used in determination in step S403 in a flow chart illustrated in FIG. 4 and described below.

Furthermore, in the present exemplary embodiment, the user can register a device permitted to be connected with the Wi-Fi Direct (hereafter referred to as permitted device) on the printing device 100. When a device registered as a permitted device attempts a Wi-Fi Direct connection with the printing device 100, the Wi-Fi Direct connection is executed without requiring user confirmation even if the user confirmation function is previously set to be valid.

Figure 3C:
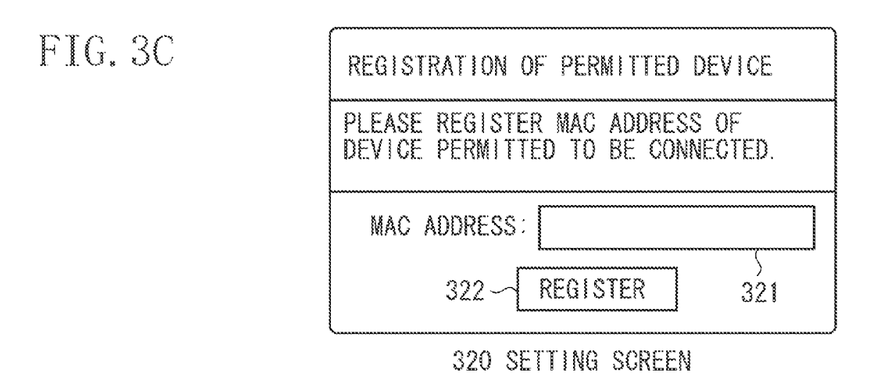

If the user selects an item 313 on the setting screen 310, a setting screen 320 illustrated in FIG. 3C is displayed on the operation panel 211. The user inputs (specifies) a media access control (MAC) address of a device (for example, the portable terminal 110), which the user desires to register as a permitted device to an item 321 on the setting screen 320 by using, for example, a software keyboard. After inputting the MAC address to the item 321, the user selects a button 322. As a result, the MAC address input to the item 321 is stored in a memory such as the HDD 205, and the device having the MAC address is handled as the permitted device.

Furthermore, if the user selects an item 314 on the setting screen 310, a confirmation screen (not illustrated) for confirming a device registered as the permitted device is displayed. On the confirmation screen, the user can also delete information of a device registered as the permitted device.

Note that in the present exemplary embodiment, any user is able to conduct setting on the setting screen 310. However, only a specific user (for example, a user having administrator authority) may be allowed to conduct setting on the setting screen 310 by introducing a user authentication function into the printing device 100.

Figure 4:
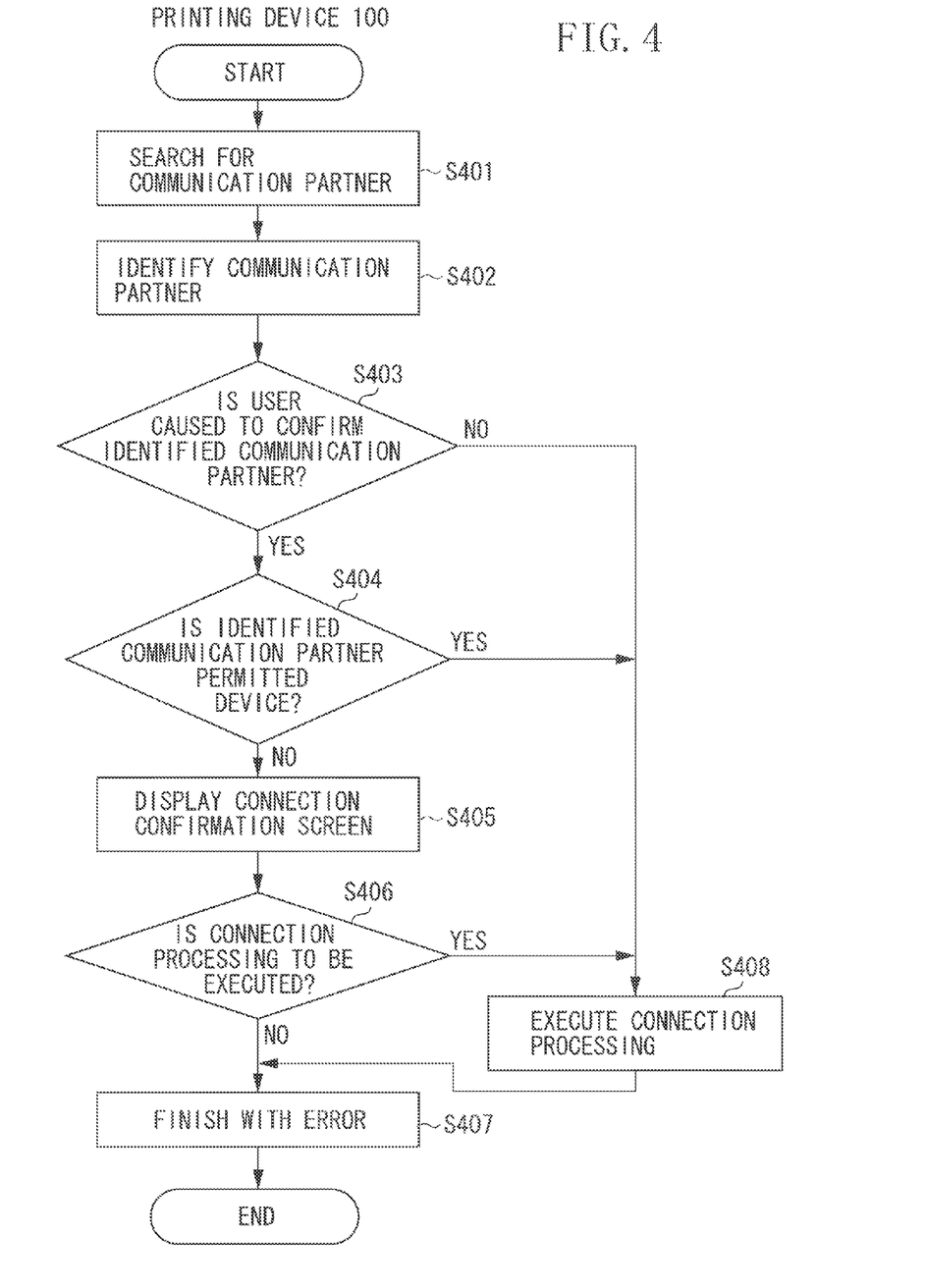
FIG. 4 is a flow chart illustrating processing executed by a printing device in a first exemplary embodiment.

Processing executed when the user has selected the item 301 on the setting screen 300 in the present exemplary embodiment will now be described with reference to a flow chart illustrated in FIG. 4. The CPU 202 develops a program stored in a memory such as the ROM 204 onto the RAM 203 and executes the developed program. As a result, steps illustrated in the flow chart in FIG. 4 are processed.

If the user selects the item 301 on the setting screen 300, first in step S401, the wireless LAN I/F 212 searches for a communication partner. In the present exemplary embodiment, the wireless LAN I/F 212 transmits a search packet for searching for an external device that is executing connection processing. In the present exemplary embodiment, the user instructs also an external device to conduct connection processing of wireless communication at the same timing as step S401. As a result, an external device that is executing connection processing is searched for by the processing in step S401.

Then, in step S402, the CPU 202 identifies a communication partner of wireless communication. In the present exemplary embodiment, the CPU 202 identifies an external device that has first answered to the search packet transmitted in step S401, as a communication partner.

Then, in step S403, the CPU 202 determines whether to prompt the user to confirm the communication partner identified in step S402. In the present exemplary embodiment, when a memory such as the HDD 205 stores information that the user has selected the item 311 on the setting screen 310, the CPU 202 determines to prompt the user to confirm the identified communication partner (YES in step S403) and the processing proceeds to step S404. On the other hand, when the memory such as the HDD 205 stores information that the user has selected the item 312 on the setting screen 310, the CPU 202 determines not to prompt the user to confirm the identified communication partner (NO in step S403) and the processing proceeds to step S408.

Step S408 will now be described. In step S408, the wireless LAN I/F 212 executes connection processing with the communication partner identified in step S402. In the present exemplary embodiment, four kinds of processing described below are conducted as the connection processing. First processing is role determination for determining which device becomes the access point (GroupOwner) and which device becomes the client. Second processing is sharing parameters by using the WPS. Third processing is the secure connection by using the shared parameters. The fourth processing is addressing for executing IP communication between the printing device 100 and the external device. These four kinds of processing is processing similar to the processing sequences in the Wi-Fi Direct described with reference to steps S102 to S105 in FIG. 1. Wireless communication is established between the printing device 100 and the external device by conducting the four kinds of processing in step S408 as the connection processing. As a result, the printing device 100 and the external device can execute communication with each other directly.

Step S404 will now be described. In step S404, the CPU 202 determines whether the communication partner identified in step S402 is previously registered as the permitted device, based on information stored in a memory such as the HDD 205. Specifically, when a MAC address of the identified communication partner coincides with the MAC address of the device registered as the permitted device on the setting screen 320, the CPU 202 determines that the identified communication partner is the permitted device (YES in step S404) and the processing proceeds to step S408. In step S408, the wireless LAN I/F 212 executes the connection processing with the identified communication partner. In other words, when the communication partner identified in step S402 is a device satisfying a predetermined condition (when the identified communication partner is a device registered as the permitted device), the connection processing is executed without requiring user confirmation in step S405 described below.

On the other hand, when the MAC address of the identified communication partner does not coincide with the MAC address of the device registered as the permitted device, in step S404, the CPU 202 determines that the identified communication partner is not the permitted device (NO in step S404) and the processing proceeds to step S405.

Note that in the present exemplary embodiment, an answer packet transmitted by an external device in response to the search packet transmitted in step S401 includes a MAC address of the external device. The MAC address is acquired from the answer packet. The determination in step S404 is conducted based on the acquired MAC address and information stored in the memory such as the HDD 205.

Step S405 will now be described. In step S405, the CPU 202 displays a connection confirmation screen 500 illustrated in FIG. 5 on the operation panel 211. The connection confirmation screen 500 is a screen for the user to ascertain whether the external device identified in step S402 is a communication partner intended by the user. In the present exemplary embodiment, the user instructs the external device as well to conduct connection processing of wireless communication. If another user gives a similar instruction to a different external device at the same timing, however, there is a possibility that the different external device might be identified as the communication partner in step S402. The connection confirmation screen 500 is displayed in step S404 to prompt the user to realize when an external device that is not intended by the user is identified as the communication partner.

Figure 5:
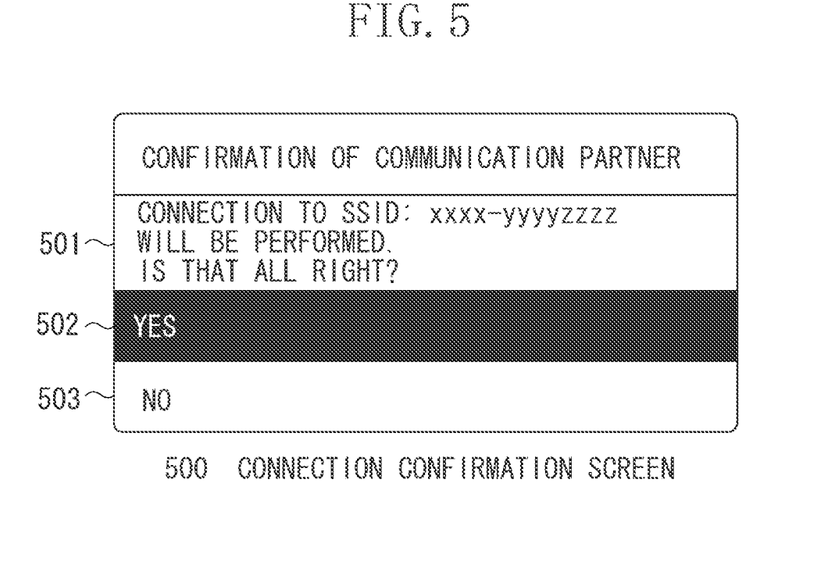
FIG. 5 is a diagram illustrating a screen displayed on the operation panel.

On the connection confirmation screen 500, discrimination information for the user to discriminate the external device identified as the communication partner in step S402 is displayed in an item 501. On the connection confirmation screen 500, a service set identifier (SSID) of the external device identified as the communication partner is displayed in the item 501. Note that, in the present exemplary embodiment, the SSID of the external device is included in the answer packet transmitted by the external device in response to the search packet transmitted in step S401. The SSID acquired from the answer packet is displayed in the item 501. Furthermore, the discrimination information is not restricted to the SSID. It is also possible to include in the answer packet other discrimination information (for example, an arbitrary name of the external device). Discrimination information different from the SSID may be displayed in the item 501.

Upon confirming the external device identified as the communication partner in the item 501 on the connection confirmation screen 500, the user selects an item 502 or an item 503. When the external device displayed in the item 501 is the external device intended by the user, the user selects the item 502. On the other hand, when the external device displayed in the item 501 is not the external device intended by the user, the user selects the item 503.

Then, in step S406, the CPU 202 determines whether to execute connection processing with the communication partner identified in step S402. When the user selects the item 502 on the connection confirmation screen 500, the CPU 202 determines to execute the connection processing and the processing proceeds to step S408. In step S408, the wireless LAN I/F 212 executes connection processing with the communication partner identified in step S402.

On the other hand, when the user has selected the item 503 on the connection confirmation screen 500, in step S406, the CPU 202 determines not to execute the connection processing (NO in step S406) and the processing proceeds to step S407.

In step S407, the CPU 202 error-finishes without executing the connection processing described in step S408. In this case, the external device identified in step S402 is not the external device intended by the user. Therefore, the CPU 202 performs control not to execute wireless communication with the external device that is not intended. Owing to the processing in step S407, communication with the external device that is not intended by the user can be prevented.

As described above, according to the present embodiment, when an external device that becomes the communication partner of wireless communication is identified, it is possible to prompt the user to ascertain whether the identified external device is the device intended by the user as described heretofore. As a result, communication with an external device that is not intended by the user can be prevented.

Furthermore, according to the present exemplary embodiment, the user can previously set in the printing device 100 whether to validate the user confirmation function of prompting the user to ascertain whether the identified external device is the external device intended by the user. As a result, the user can make confirmation function valid when it is desired to prevent communication with an external device that is not intended and confirmation function invalid when it is desired to shorten time required until the connection processing with the external device is completed. Furthermore, in an environment in which one or more external devices do not exist or the number of external devices is small, the possibility of being connected to the external device that is not intended by the user is low. Therefore, the time required until the connection processing with the external device is completed can be shortened by making the user confirmation function invalid.

Furthermore, according to the present exemplary embodiment, the user can previously register in the printing device 100 a device permitted to be connected with the Wi-Fi Direct (permitted device). As a result, it is possible to execute the connection processing of the Wi-Fi Direct without displaying the connection confirmation screen 500 on condition that the external device identified as the communication partner of wireless communication coincides with the previously registered permitted device. For example, a portable terminal of a reliable user is previously registered as a permitted device. When the reliable user uses the Wi-Fi Direct, therefore, connection processing is executed without requiring confirmation on the connection confirmation screen 500 even if the user confirmation function is valid.

Note that, in the present exemplary embodiment, a configuration has been described that has the memory such as the HDD 205 in the printing device 100 for storing information indicating the permitted device. However, the information indicating the permitted device may be stored in an external server other than the printing device 100. In this case, the determination in step S404 is executed by referring to information stored in the external server.

In the first exemplary embodiment, it has been described that information indicating the permitted device is registered in the printing device 100 using the setting screen 320. In addition thereto, in the second exemplary embodiment, a configuration will be described which registers a communication partner as a permitted device when the communication partner is confirmed using the user confirmation function. Note that a configuration of the printing device 100 in the present exemplary embodiment is the same configuration as the first exemplary embodiment (the configuration described with reference to FIG. 2). Therefore, description thereof will be omitted.

Figure 6:
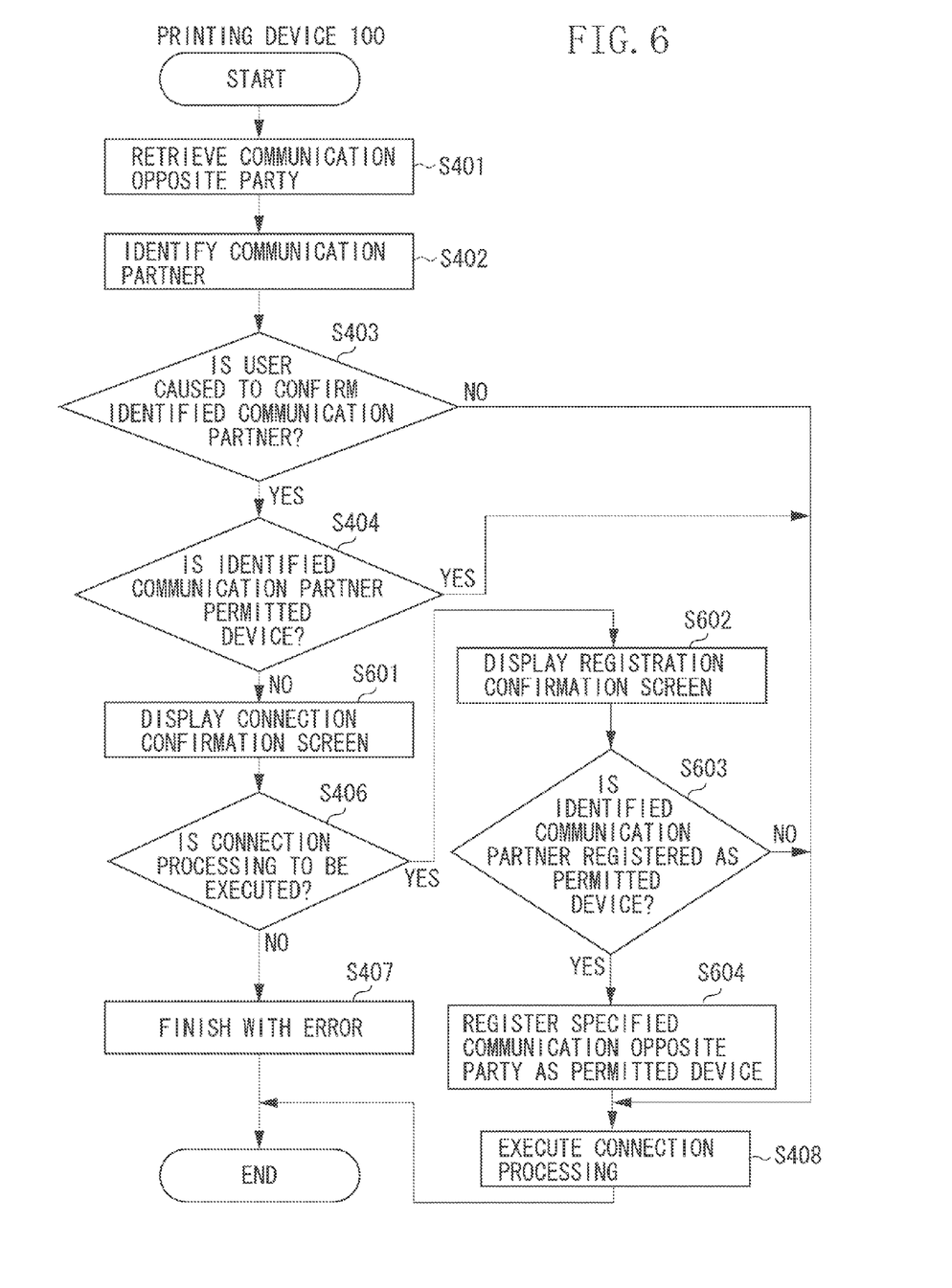
FIG. 6 is a flow chart illustrating processing executed by a printing device in a second exemplary embodiment.

Processing executed when the user has given an instruction to execute the Wi-Fi Direct in the present exemplary embodiment (when the user has selected the item 301 in the setting screen 300) will now be described with reference to a flow chart illustrated in FIG. 6. The CPU 202 develops a program stored in a memory such as the ROM 204 onto the RAM 203 and executes the developed program. As a result, steps illustrated in the flow chart in FIG. 6 are processed. Note that, in the flow chart illustrated in FIG. 6, steps having the same numbers as those in FIG. 4 conduct the same processing as those in the flow chart illustrated in FIG. 4. Therefore, description thereof will be omitted.

In step S404, the CPU 202 determines whether the communication partner identified in step S402 is previously registered as the permitted device, based on information stored in a memory such as the HDD 205. Specifically, when a MAC address of the identified communication partner coincides with the MAC address of the device registered as the permitted device on the setting screen 320, the CPU 202 determines that the identified communication partner is the permitted device (YES in step S404) and the processing proceeds to step S408. On the other hand, when the MAC address of the identified communication partner does not coincide with the MAC address of the device registered as the permitted device on the setting screen 320, the CPU 202 determines that the identified communication partner is not the permitted device (NO in step S404) and the processing proceeds to step S601.

Step S601 will now be described. In step S601, the CPU 202 displays a connection confirmation screen 700 illustrated in FIG. 7A on the operation panel 211. The connection confirmation screen 700 is a screen for the user to ascertain whether the external device identified in step S402 is a communication partner intended by the user in the same way as the connection confirmation screen 500 illustrated in FIG. 5.

Figure 7A:
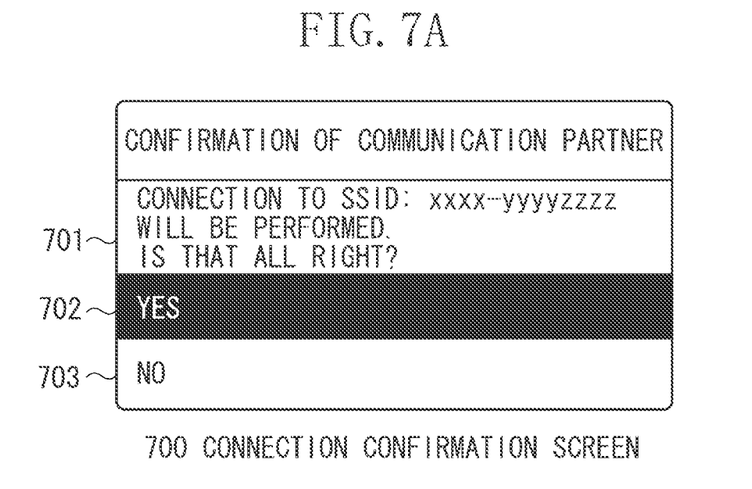
FIGS. 7A and 7B are diagrams illustrating screens displayed on an operation panel.

Discrimination information for the user to discriminate the external device identified as the communication partner in step S402 is displayed in an item 701 on the connection confirmation screen 700. When the external device displayed in the item 701 is an external device intended by the user, the user selects an item 702. On the other hand, when the external device displayed in the item 701 is not the external device intended by the user, the user selects an item 703.

Then, in step S406, the CPU 202 determines whether to execute connection processing with the communication partner identified in step S402. When the user selects the item 703 on the connection confirmation screen 700, the CPU 202 determines not to execute the connection processing (NO in step S406) and the processing proceeds to step S407. In step S407, the CPU 202 error-finishes without executing the connection processing.

When the user selects the item 702 on the connection confirmation screen 700, in step S406, the CPU 202 determines to execute the connection processing (YES in step S406) and the processing proceeds to step S602. In step S602, the CPU 202 displays a registration confirmation screen 710 illustrated in FIG. 7B on the operation panel 211. The registration confirmation screen 710 is a screen for the user to select whether to register the external device identified in step S402 as a permitted device. A user who wants to handle the external device identified in step S402 as a permitted device thereafter selects an item 711 on the registration confirmation screen 710. On the other hand, a user who does not want to handle the external device identified in step S402 as a permitted device selects an item 712.

Figure 7B:
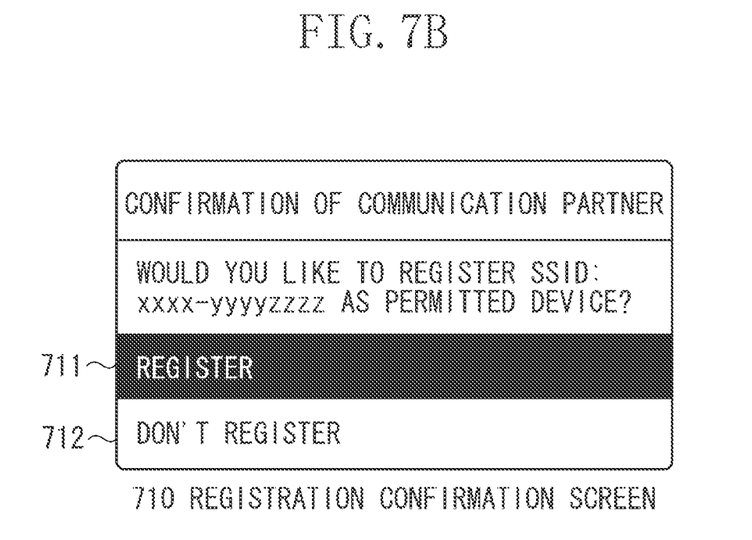

Then, in step S603, the CPU 202 determines whether to register the communication partner identified in step S402 as a permitted device. In the present exemplary embodiment, when the user has selected the item 711 on the registration confirmation screen 710, the CPU 202 determines to register the communication partner as a permitted device (YES in step S603) and the processing proceeds to step S604. In step S604, the CPU 202 stores the identified communication partner in a memory such as the HDD 205 as a permitted device. Specifically, the CPU 202 stores a MAC address of the identified communication partner in the memory such as the HDD 205 as information indicating a permitted device. The processing proceeds to step S408 and connection processing is executed. In other words, when the user has selected the item 711 on the registration confirmation screen 710, both registration of the communication partner identified in step S402 as a permitted device and establishment of wireless communication with the communication partner identified in step S402 are executed.

Note that, in the present exemplary embodiment, an answer packet transmitted by an external device in response to the search packet transmitted in step S401 includes a MAC address of the external device. The MAC address is acquired from the answer packet. In step S604, the acquired MAC address is stored in the memory such as the HDD 205 as information indicating a permitted device.

On the other hand, when the user has selected the item 712 on the registration confirmation screen 710, in step S603, the CPU 202 determines not to register the communication partner identified in step S402 as a permitted device (NO in step S603) and the processing proceeds to step S408. In this case, connection processing is executed without executing the processing in step S604 (in other words, without registering the communication partner identified in step S402 as a permitted device).

As described above, according to the present exemplary embodiment, a communication partner can be registered as a permitted device when the communication partner is confirmed using the user confirmation function. For example, when the communication partner identified in step S402 is the portable terminal 110 and the user has given an instruction on the registration confirmation screen 710 to register the portable terminal 110 as a permitted device, in step S604, the portable terminal 110 is registered as a permitted device. When the portable terminal 110 and the printing device 100 conduct the Wi-Fi Direct connection next time, therefore, in step S404, it is determined that the portable terminal 110 is a permitted device. Therefore, connection processing is executed without displaying the connection confirmation screen 700.

Furthermore, since a communication partner can be registered as the permitted device when the communication partner is confirmed using the user confirmation function, it becomes unnecessary for the user to input the MAC address of the communication partner to the printing device 100. Therefore, a registration mistake in a permitted device caused by an input error of the MAC address can be prevented.

OTHER EMBODIMENTS

In the above-described exemplary embodiments, it has been described that when it is determined that the identified communication partner is a permitted device (when the results are determined to be Yes in step S404 in FIG. 4 and FIG. 6) connection processing is executed without displaying the connection confirmation screen. The present invention is not restricted to this. The connection confirmation screen may also be displayed when it is determined that the identified communication partner is a permitted device. In this case, the identified communication partner is a permitted device, and the user confirmation is not necessary. For example, connection processing may be executed under a condition that the user has not given an instruction to conduct connection for a predetermined time.

Furthermore, in the above-described exemplary embodiments, it has been described that the printing device 100 and the portable terminal 110 execute the Wi-Fi Direct as wireless communication. Wireless communication is not restricted to the Wi-Fi Direct. As long as one or more communication apparatuses can communicate directly as in the Wi-Fi Direct, the present invention can be applied.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-093889 filed Apr. 26, 2013, which is hereby incorporated by reference herein in its entirety.

What is claimed is:

1. A communication apparatus capable of executing a direct wireless communication, the communication apparatus comprising:
an identification unit configured to identify one external device as a communication partner of the direct wireless communication, by performing search processing;
a determination unit configured to determine whether the external device identified by the identification unit is a permitted device that is permitted as a communication partner of the direct wireless communication;
a display unit configured to display a confirmation screen to prompt a user to ascertain whether to establish the direct wireless communication between the communication apparatus and the external device when the determination unit has determined that the external device is not the permitted device; and
a connection unit configured to execute connection processing for establishing the direct wireless communication between the communication apparatus and the external device when the determination unit has determined that the external device is the permitted device or when the user has given an instruction to establish the direct wireless communication via the confirmation screen.

2. The communication apparatus according to claim 1, wherein, when the user has given an instruction not to establish the direct wireless communication via the confirmation screen, the connection unit does not execute the connection processing.

3. The communication apparatus according to claim 1, wherein, when the determination unit has determined that the external device is the permitted device, the display unit does not display the confirmation screen, and the connection unit executes the connection processing.

4. The communication apparatus according to claim 1, further comprising a registration unit configured to register information that indicates a device to be handled as the permitted device,
wherein the determination unit determines whether an external device identified by the identification unit is the permitted device based on information registered by the registration unit.

5. The communication apparatus according to claim 4, further comprising an inquiry unit configured to inquire of a user whether to register the external device as the permitted device when the user has given an instruction to establish the direct wireless communication via the confirmation screen,
wherein, when the user has given an instruction to register the external device as the permitted device as a result of the inquiry conducted by the inquiry unit, the registration unit registers information indicating the external device.

6. The communication apparatus according to claim 4, wherein the registration unit registers a MAC address as information indicating the permitted device.

7. The communication apparatus according to claim 1, wherein the direct wireless communication is communication based on Wi-Fi Direct.

8. The communication apparatus according to claim 1, wherein the communication apparatus is a printing apparatus capable of executing printing processing.

9. The communication apparatus according to claim 1, wherein when the communication apparatus executes the direct wireless communication, either one of the communication apparatus and the external device identified by the identification unit operates as an access point.

10. The communication apparatus according to claim 1, wherein identification information of the external device identified by the identification unit is displayed on the confirmation screen.

11. The communication apparatus according to claim 10, wherein the identification information is a name of the external device identified by the identification unit.

12. A control method for a communication apparatus capable of executing a direct wireless communication, the control method comprising:
identifying one external apparatus as a communication partner of the direct wireless communication, by performing search processing;
determining whether the external device identified by the identification unit is a permitted device that is permitted as a communication partner of the direct wireless communication;
displaying a confirmation screen to prompt a user to ascertain whether to establish the direct wireless communication between the communication apparatus and the external device when it is determined that the external device is not the permitted device; and
executing connection processing for establishing the direct wireless communication between the communication apparatus and the external device when the external device is determined to be the permitted device or when the user has given an instruction to establish the direct wireless communication via the confirmation screen.

13. A non-transitory computer readable storage medium that stores a program capable of causing a computer to execute the control method for the communication apparatus according to claim 12.

* * * * *